United States Patent [19]

Grebb

[11] 4,253,952
[45] Mar. 3, 1981

[54] WEED SCREEN AND TRASH ELIMINATOR

[76] Inventor: Don Grebb, Rte. 1 - 1485 Highway 28, Quincy, Wash. 98848

[21] Appl. No.: 26,171

[22] Filed: Apr. 2, 1979

[51] Int. Cl.³ .......................... B01D 35/02; E02B 3/20
[52] U.S. Cl. ..................................... 210/159; 210/407; 210/170; 210/355; 210/413; 15/250.24; 405/39
[58] Field of Search ............... 210/160, 159, 158, 155, 210/154, 170, 407, 400, 355, 413; 15/250.24; 405/36, 39

[56] References Cited

U.S. PATENT DOCUMENTS

| | | | |
|---|---|---|---|
| 414,887 | 12/1889 | Rakes et al. | 210/160 |
| 452,595 | 5/1891 | Correl | 210/158 |
| 1,063,344 | 6/1913 | Fleishman | 210/160 |
| 1,150,445 | 8/1915 | Matheson | 210/160 |
| 1,180,564 | 4/1916 | Burnard | 210/158 |
| 1,331,935 | 2/1920 | Lee | 210/156 |
| 2,309,472 | 1/1943 | Morton | 210/156 |
| 3,061,103 | 10/1962 | Mitchell | 210/156 |
| 3,390,775 | 7/1968 | Bosch | 210/156 |
| 3,976,573 | 8/1976 | Miller | 210/160 |

Primary Examiner—Charles N. Hart
Assistant Examiner—E. Rollins Cross
Attorney, Agent, or Firm—Wells, St. John & Roberts

[57] ABSTRACT

A weed screen and trash eliminator for irrigation systems utilizing open ditches or canals for transmission of water. A rigid frame supports a stationary screen having a planar surface. A front trough directs water within a ditch onto the upper screen surface, which is inclined slightly from its front edge to its rear edge. The water passes through the screen, leaving weeds and other debris on the upper screen surface. Endless conveyors continuously move a transverse bristle brush along working flights that span the length of the screen. The conveyors are powered continuously in a direction such that the brush moves along the screen from front to back. A recessed catch pan is fixed across the frame immediately adjacent the rear edge of the screen to receive materials swept from the screen by the brush.

4 Claims, 4 Drawing Figures

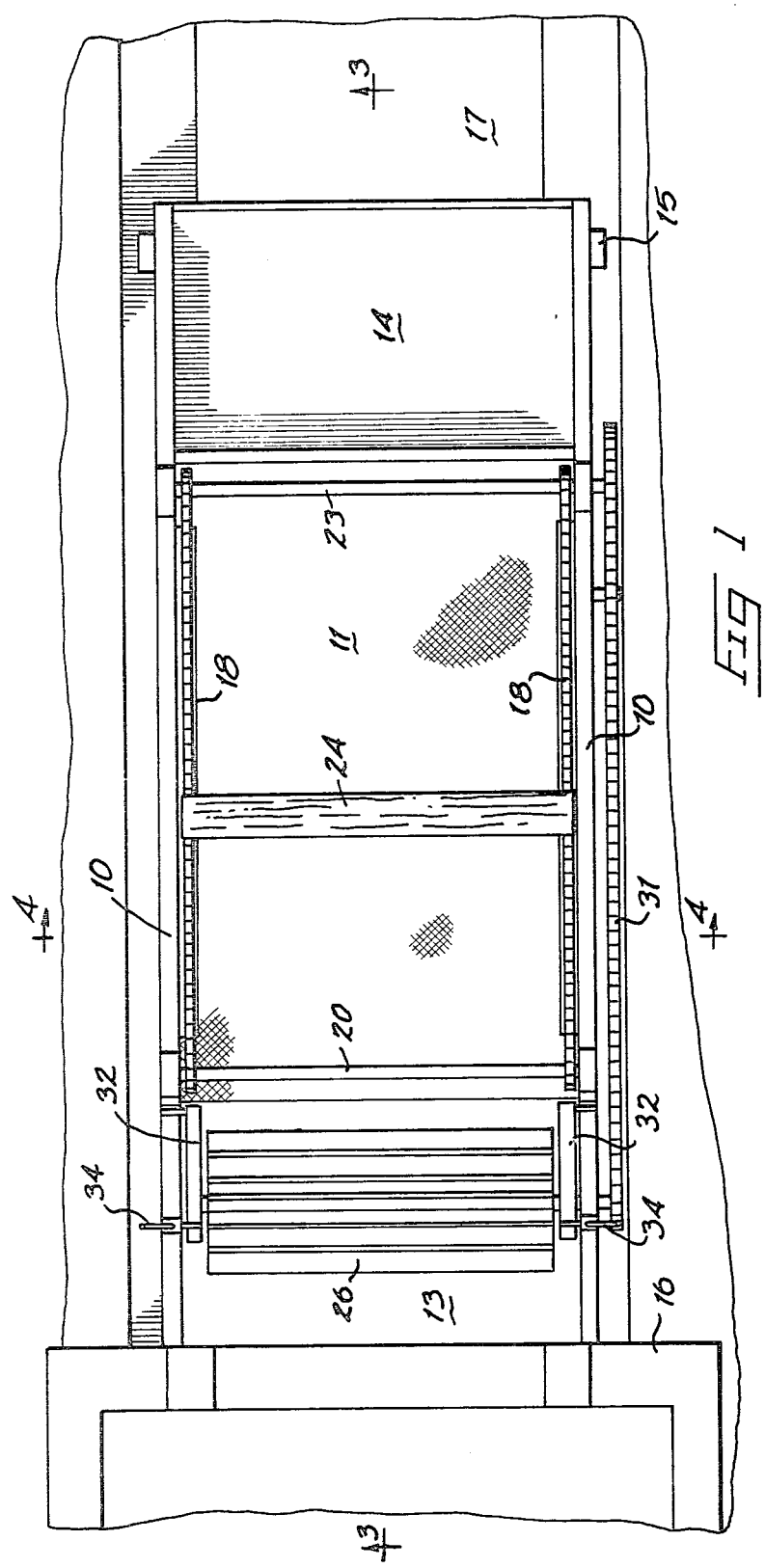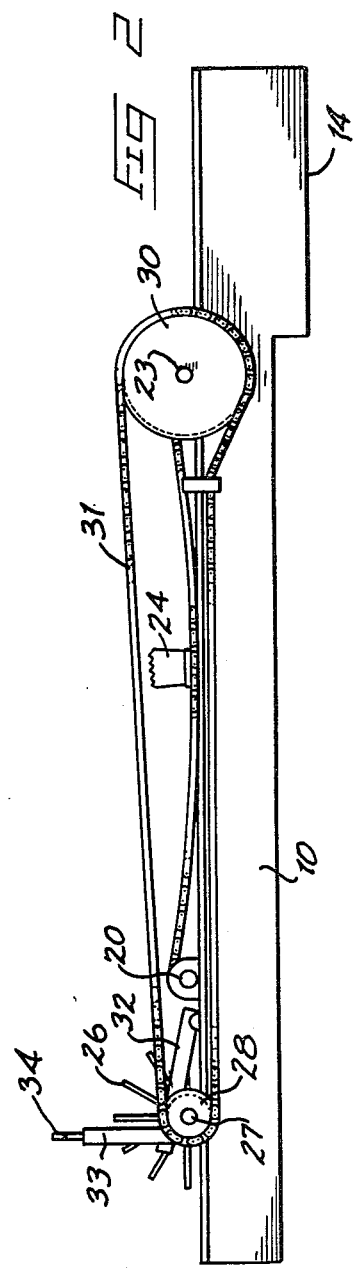

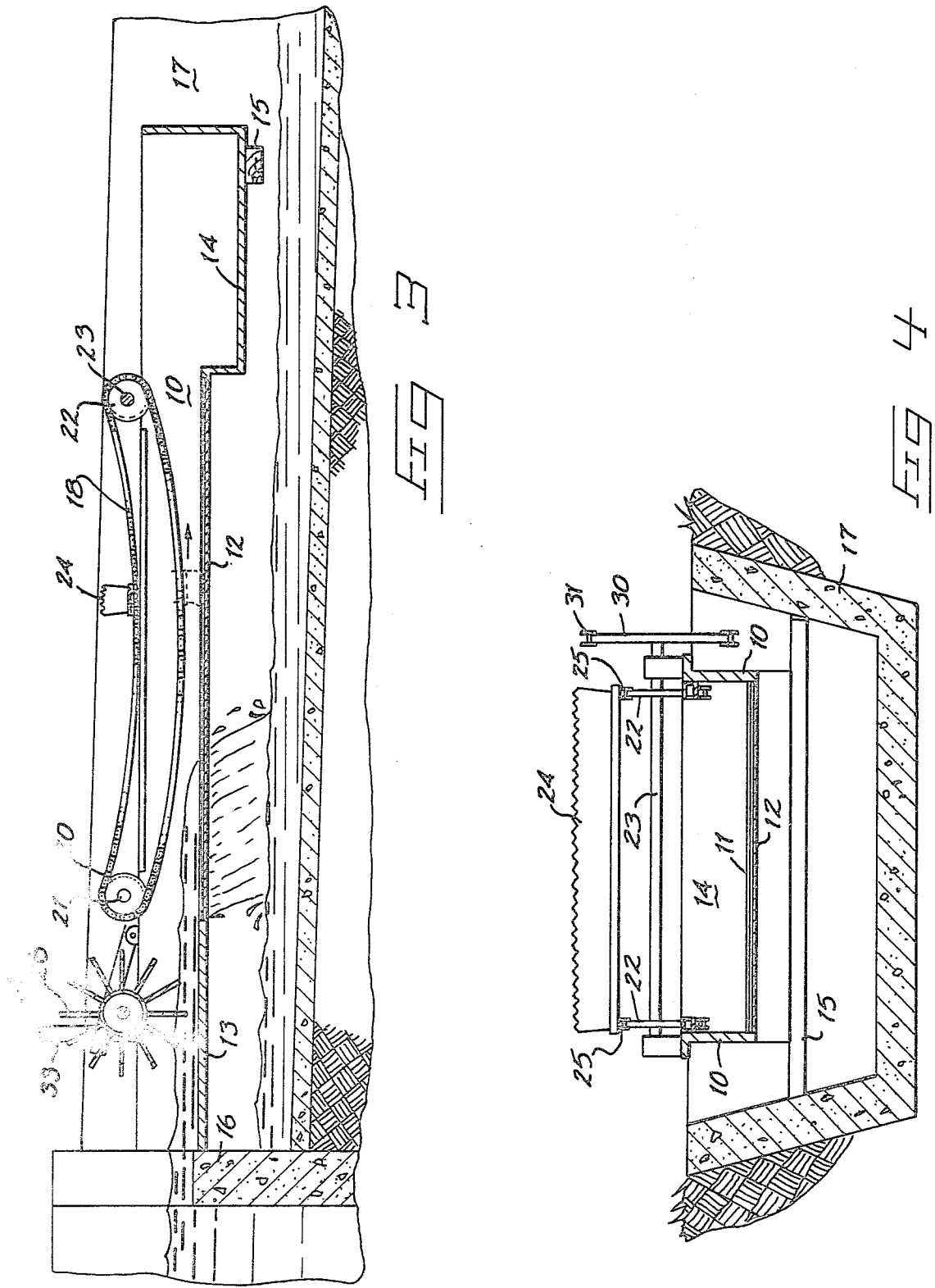

WEED SCREEN AND TRASH ELIMINATOR

BACKGROUND OF THE INVENTION

This invention relates to devices for continuously and automatically removing foreign materials that are typically carried along with the water within open irrigation ditches. These materials include moss and algae, as well as leaves, stems, litter and weed seeds. If allowed to remain in the water, such materials damage downstream pumps and clog or plug irrigation equipment, such as siphon tubes, gated pipes, and sprinklers.

The most prevalent solution to this problem today is to use stationary screens across irrigation ditches and to clean the screens manually. This requires regular periodic surveillance of the screens and regular cleaning, particularly in those seasons of the year when trash is particularly prevalent in such water systems.

The apparatus described herein serves as a continuously maintained screen. It is self-cleaning to minimize maintenance and manual effort. It permits the use of finer screen materials than is normal today by maintaining the screens in a continuous clean condition so that the finer screen mesh will not itself be clogged and rendered unusable.

DESCRIPTION OF THE DRAWINGS

FIG. 1 is a top view of the apparatus;
FIG. 2 is a side view of the apparatus;
FIG. 3 is a longitudinal sectional view taken along line 3—3 in FIG. 1;
FIG. 4 is a transverse sectional view taken along line 4—4 in FIG. 1.

DESCRIPTION OF A PREFERRED EMBODIMENT

The drawings illustrate a preferred form of the invention and show its use in a typical irrigation ditch adjacent to a weir or other water delivery canal structure that discharges water into the open ditch. The transverse weir 16 is shown at the upstream end of a relatively small lined ditch 17. The object of the invention is to remove algae, weeds, and other trash that is carried within the water entering the ditch 17, so as to minimize subsequent pump and irrigation equipment damage.

The apparatus is located within a stationary rigid frame that is substantially open and is rectangular in shape. The frame includes a pair of transversely spaced side members 10 parallel to one another. They extend longitudinally between a front end of the frame that is adapted to abut the weir 16 or other water delivery canal structure and a rear end of the frame adapted to be located downstream from its front end along the initial reach of the lined open ditch 17.

A stationary screen 11 extends transversely between the side members 10. The planar upper screen surface has a front edge facing toward weir 16 when in place, and a transverse rear edge. Screen 11 spans across the full width of the supporting frame. It is preferably a continuous sheet of screen fabric, made from woven glass fibers, nylon or a suitable metal, such as stainless steel. The fabric of screen 11 is structurally supported by an underlying layer of perforated metal 12, which structurally supports the screen material and serves as a mounting frame holding it in a planar condition.

A transverse trough 13 at the front end of the frame extends forward from the front screen edge to the front ends of the side members 10. The trough 13 is fabricated from solid sheet material and is adapted to direct incoming water from weir 16 onto the upper screen surface.

A catch pan 14 is fixed across the side members 10 adjacent the rear end of the frame. It extends rearward from the rear screen edge and is elevationally recessed from the upper screen surface. The catch pan 14 is adapted to receive materials that are swept rearwardly from screen 11. It is constructed from solid sheet material.

A pair of endless conveyors are movably mounted along the respective side members 10. Each conveyor presents a working flight spanning the length of the screen 11 and arranged substantially parallel to the screen. The endless conveyors are shown as continuous chains 18 entrained about front sprockets 20 and rear sprockets 22 respectively located adjacent the inner surfaces of the side members 10. The two front sprockets 20 are mounted to a transverse front shaft 21 rotatably journalled on the side members 10. The two rear sprockets 22 are fixed to a similar transverse rear shaft 23.

The chains 18 operate in unison. They carry a rigid bristle brush 24 that extends the full width of screen 11. The transverse brush 24 is connected to the respective chains 18 by end brackets 25 fixed to it. It is fixed across the conveyor means provided by chains 18 for sweeping engagement of the upper screen surface as the brush 24 is carried along the working flights of chains 18. It rests freely on the upper screen surface when facing downwardly. When carried along the upper or return flights of chains 18, the brush bristles will be inoperative and are directed upwardly.

The illustrated motive means for powering conveyor chains 18 is a paddle wheel 26 fixed to a central transverse shaft 27. It is rotatably journalled about a transverse axis parallel to the upper screen surface at a location forward of the front edge of the screen 11. Paddle wheel 26 is located directly above trough 13 so as to be engaged by the incoming water received over the weir 16 and flowing across trough 13. The shaft 27 has a driving sprocket 28 fixed to it. A driving chain 31 is entrained about both sprocket 28 and a driven sprocket 30, which is fixed to the rear shaft 23. Thus, rotation of paddle wheel 26 will result in movement of the chains 18.

The supporting framework 32 for the paddle wheel 26 and shaft 27 is vertically adjustable to allow the user to match the location of the paddle wheel 26 to the available water flow. The framework 32, which is pivoted at its rear ends to side members 10, is connected by conventional lifting jack assemblies 33 at their forward ends. The lifting jacks 33, which include relatively rotatable threaded members, are individually operable by means of handles 34. They permit vertical adjustment of each end of shaft 27 and paddle wheel 26.

In operation, the frame for the apparatus is fixed within the ditch 17 at the downstream side of the weir 16 or other water source. The frame is positioned within the ditch 17 at a height such that the screen 11 is at least a couple inches above the water surface level within ditch 17. This assures free flow of water along trough 13, through screen 11 and into the ditch 17. It is also advisable that the screen 11 be inclined slightly in an upward direction from its front edge to its rear edge. This eliminates substantial downstream flow of water along the upper surface of the screen 11.

Positioning of the frame is accomplished by adjustment of rigid supports beneath it. The illustrated supports 15 are simply transverse bars fixed under the side members 10 and engaging the inclined sides of the lined ditch 17. Supporting legs or other devices can be substituted as necessary. Likewise, the frame can be held stationary within the ditch 17 by frictional engagement of its support members, or can be rigidly anchored at its front end to the weir structure. In any respect, the frame is located in such fashion as to insure that all water entering the ditch 17 will be directed onto the trough 13 and the porous screen 11.

As the water entering ditch 17 passes through the screen 11, weeds, seeds, clumped algae and other debris is filtered from the water and left on the upper surface of the relatively fine screen fabric. If it were left unattended for any substantial time, the screen 11 would clog and be rendered inoperative. Therefore, the screen 11 is continuously swept by the transverse brush 24, which is powered so as to move along the length of screen 11 from its front edge to its rear edge. The brush 24 sweeps all the debris from front to back along the planar screen surface. It is capable of exerting a light positive sweeping pressure across the screen fabric because the fabric is supported by the perforated metal sheet 12. The brush 24 deposits loose material from the top surface of screen 11 into the catch pan 14, where it is retained until emptied during periodic manual maintenance of the apparatus.

The above structure is relatively simple and requires very little maintainence. It automatically operates at all times during which water is being directed into the ditch 17, since the moving flow of water is used directly to power the paddle wheel 26. It therefore requires no external source of energy, although electric motor drives can be substituted in place of the paddle wheel if desired. The screen apparatus works day and night, and frees the user from the tedious task of manually cleaning the conventional screens used in irrigation ditches.

Having described my invention, I claim:

1. A weed screen and trash eliminator for use in irrigation canal systems, comprising:

a rigid open frame having longitudinal sides extending from a front end of the frame that is adapted to abut a weir or other water delivery structure to a rear end of the frame that is adapted to be located downstream from its front end;

a longitudinal stationary screen extending transversely between the sides of the open frame and including a planar upper screen surface having a front transverse edge and a rear transverse edge;

movable endless conveyor means mounted along the sides of the frame, said conveyor means including working flights spanning the length of the screen and arranged parallel to the planar upper screen surface;

transverse bristle brush means fixed across the conveyor means for engagement against the upper screen surface as the brush means is carried along the working flights of said conveyor means;

motive means mounted on said framework and operably connected to said conveyor means for imparting motion to said conveyor means for imparting motion to said conveyor means in a direction such that the brush means fixed thereto is swept along the upper screen surface from its front edge to its rear edge;

means on the frame for directing incoming water from the weir or other water delivery structure onto the planar upper screen surface;

and an elevationally recessed catch pan fixed across the frame immediately adjacent the rear edge of the screen, said catch pan having solid walls adapted to retain material swept from the rear edge of the screen by said brush means.

2. An apparatus as set out in claim 1 wherein said endless conveyor means comprises:

a pair of endless chains each entrained about the front and rear sprockets along the respective longitudinal sides of the frame;

a front transverse shaft rotatably mounted to said frame about a first transverse axis and having the front sprockets fixed thereto;

a rear transverse shaft rotatably mounted to said frame about a second transverse axis and having the rear sprockets fixed thereto;

and brackets fixed to each chain at transversely aligned positions, said brackets being secured to opposite ends of the brush means.

3. A weed screen and trash eliminator for use in irrigation canal systems, comprising:

a rigid frame having a pair of transversely spaced parallel side members;

a planar screen fixed across the side members and having an open upper surface extending longitudinally between a front screen edge and a rear screen edge;

a solid trough fixed across the side members, said trough extending forward from the front screen edge and adapted to direct all incoming water received thereon to the upper surface of the screen;

a catch pan fixed across the side members, said catch pan extending rearwardly from the rear screen edge and being elevationally recessed below the screen, said catch pan being adapted to receive materials swept rearwardly from the upper surface of the screen;

a pair of endless chain conveyors movably mounted along the respective side members, each chain conveyor presenting a working flight spanning the length of the screen, the working flights being arranged substantially parallel to the screen;

a transverse bristle brush mounted at opposite ends to the endless conveyors, said brush resting in sweeping engagement against the upper surface of the screen along the working flights of the conveyors; and motive means on said frame operatively connected to said endless means operatively connected to said endless conveyors for powering the conveyors in a direction such that the brush sweeps over the upper surface of the screen from its front edge to its rear edge as the brush is moved along the working flights of the endless conveyors.

4. An apparatus as set out in claim 3 further comprising:

support means fixed to the side members of the frame for mounting the frame within an irrigation ditch in an orientation such that the screen is inclined upwardly from its front screen edge to its rear screen edge.

* * * * *